United States Patent
Wang

(10) Patent No.: US 9,181,461 B2
(45) Date of Patent: Nov. 10, 2015

(54) HOT MELT SEALANT AND FOAM-IN-PLACE GASKETING MATERIAL

(75) Inventor: Baoyu Wang, Waukesha, WI (US)

(73) Assignee: Bostik, Inc, Wauwatosa, WI (US)

( * ) Notice: Subject to any disclaimer, the term of this patent is extended or adjusted under 35 U.S.C. 154(b) by 689 days.

(21) Appl. No.: 11/507,245

(22) Filed: Aug. 17, 2006

(65) Prior Publication Data

US 2007/0042193 A1   Feb. 22, 2007

Related U.S. Application Data

(60) Provisional application No. 60/709,047, filed on Aug. 17, 2005.

(51) Int. Cl.
| | |
|---|---|
| C08L 23/00 | (2006.01) |
| C09J 123/14 | (2006.01) |
| B32B 7/12 | (2006.01) |
| B32B 25/14 | (2006.01) |
| C09J 123/04 | (2006.01) |
| C09J 123/08 | (2006.01) |
| C09J 123/10 | (2006.01) |
| C09J 123/16 | (2006.01) |
| C09J 153/00 | (2006.01) |
| C09J 153/02 | (2006.01) |
| C08L 23/14 | (2006.01) |

(52) U.S. Cl.
CPC .............. *C09J 123/142* (2013.01); *B32B 7/12* (2013.01); *B32B 25/14* (2013.01); *C09J 123/04* (2013.01); *C09J 123/0853* (2013.01); *C09J 123/0869* (2013.01); *C09J 123/10* (2013.01); *C09J 123/16* (2013.01); *C09J 153/005* (2013.01); *C09J 153/02* (2013.01); *C08L 23/14* (2013.01); *Y10T 428/31551* (2015.04); *Y10T 428/31786* (2015.04); *Y10T 428/31931* (2015.04); *Y10T 428/31938* (2015.04)

(58) Field of Classification Search
CPC ........................................................ C08L 23/14
USPC .................................................. 524/505, 528
See application file for complete search history.

(56) References Cited

U.S. PATENT DOCUMENTS

| | | | |
|---|---|---|---|
| 4,379,114 A | 4/1983 | Fujiki et al. | |
| 4,404,056 A | 9/1983 | Kakehi et al. | |
| 5,242,727 A | 9/1993 | Briddell et al. | |
| 5,612,141 A | 3/1997 | Davis et al. | |
| 5,618,883 A | 4/1997 | Plamthottam et al. | |
| 5,798,175 A | 8/1998 | Tynan, Jr. et al. | |
| 6,143,818 A * | 11/2000 | Wang et al. | 524/528 |
| 7,199,180 B1 * | 4/2007 | Simmons et al. | 524/570 |
| 2004/0115456 A1 * | 6/2004 | Kanderski et al. | 428/500 |

FOREIGN PATENT DOCUMENTS

| | | |
|---|---|---|
| EP | 0672737 | 9/1995 |
| EP | 0714963 | 6/1996 |
| WO | WO 00/37553 | 6/2000 |
| WO | WO 01/10967 | 2/2001 |
| WO | WO 2004/039907 | 5/2004 |

\* cited by examiner

*Primary Examiner* — Peter D Mulcahy
(74) *Attorney, Agent, or Firm* — Wozny Law, LLC; Thomas M. Wozny

(57) ABSTRACT

A hot melt sealant and foam-in-place gasket composition based on a rubber such as ethylene propylene rubber (EPR) and/or ethylene propylene diene rubber (EPDM) and at least one semicrystalline olefinic polymer. The hot melt composition includes the rubber or a blend of rubbers in an amount of 5% to 50% by weight, at least one semicrystalline olefinic polymer in an amount of 5% to 40% by weight, at least one amorphous poly-α-olefin (APAO) polymer in an amount of 0% to 70% by weight, a compatible tackifier in an amount of 0% to 50% by weight, and a plasticizer in an amount of at least 30% by weight. The composition is particularly useful for foamed gasket applications as a replacement for pressure sensitive adhesive (PSA) coated foam tape.

14 Claims, No Drawings

HOT MELT SEALANT AND FOAM-IN-PLACE GASKETING MATERIAL

CROSS REFERENCE TO RELATED APPLICATION

This application claims priority to U.S. Provisional Application No. 60/709,047, filed Aug. 17, 2005.

FIELD OF INVENTION

This invention relates to a novel hot melt sealant and gasketing material composition based on rubber together with at least one semicrystalline olefinic polymer. More particularly, this invention relates to hot melt sealant and gasketing material compositions which find utilities in manufacturing windows, doors, air filters, auto weather strips, speakers and the like. The composition of the present invention is particularly useful for foamed gasket applications as a replacement for PSA coated foam tape.

BACKGROUND OF THE INVENTION

Sealants and foam-in-place gasket materials are any of a wide variety of materials that can form a seal to prevent passage of a liquid or a gas. They are widely used in all sectors of manufacturing ranging from the high tech aerospace industry to the conventional construction industry. Sealants are generally used as a barrier or a means of protection to stop infiltration of dust, dirt, moisture, oil and the like. Gaskets, on the other hand, are typically used between matched machine parts or around pipe joints and the like to contain a gas or liquid. Both sealants and gaskets are often used to provide other important functions such as a sound, vibration and fire barrier, thermal and electrical insulator, and joining material. More frequently, they are utilized to serve multiple roles to perform several of these functions. Sealants usually consist of a mixture of chemicals and can come in the form of a liquid, semi-liquid or solid. They can be applied to substrates in the same way as adhesives by using an application equipment or by hand from a cartridge. Gaskets, on the other hand, embrace a wide range of materials coming in a variety shapes and forms. They are often supplied as pre-fabricated parts, examples of which are rubber O-rings and auto weather strips. Foam-in-place materials are a special type of gasket material similar in both composition and physical forms to sealants, and are applied by using the same types of application methods. There is considerable overlap in functional property requirements between sealants and foam-in-place gasket materials, thus, it is not atypical to see one product to be used in both places. To function properly, a sealant or a form-in-place gasket must have a good adhesion to the substrate to be joined, good flexibility, low shrinkage, softness, resistance to temperature fluctuation, easy application and sag or slump resistance.

Many types of wet sealants in the form of petroleum gels are commercially available from a variety of sources for industrial and consumer applications. These wet sealants include silicones, acrylics, polysulfides, polyurethanes and silyl polyethers. They are especially suitable for manual application by using a cartridge gun and are popular on construction sites of residential, industrial and office buildings to seal exterior and interior joints such as the gaps at corners of sidings of residential houses. These types of sealants consist of either a liquid curable oligomer or a solvent polymer and usually have poor green strength. It can take days for the strength to develop fully. They serve well in construction area where high green strength is not needed. Due to their poor green strength, these products, however, are not suitable for today's industrial assembly applications where high productivity is required. Hot melt sealants and foam-in-place gaskets based on butyl, moisture curable polyurethane and styrenic block copolymers (SBC) have overcame the green strength problem and have been used for industrial assembly. Hot melts, on the other hand, have their own shortcomings. The butyl and SBC based products do not have adequate adhesion to many plastic substrates. In addition, butyl sealant usually has high viscosity and poor application characteristics. It is usually not foamable and therefore, cannot be used as foam-in-place gasket material. Although well-formulated moisture curable hot melt polyurethanes can provide both good adhesion and green strength, these type of products are notorious in their handling and application process. From product to application, care must be taken in every step of the way to exclude moisture from the package in order to avoid premature curing. The potential health hazards of toxic residue isocyanate monomer is also a concern. A need, therefore, exists for a hot melt sealant and foam-in-place gasket material that has high green strength, good adhesion to various substrates, low tack, no toxicity and easy application.

The composition of the present invention, which is based on rubber together with at least one semicrystalline olefinic polymer, can adequately meet these needs and advantageously provides good adhesion, good green strength, low or no tack, no toxicity, easy application, excellent cleaner fluid resistance. The composition has particularly excellent flexibility and resiliency to provide conformity to the shape of the gap to be sealed. This character also enables the hot melt composition to withstand the thermal stresses under temperature fluctuation, thereby offering excellent seal durability in situations where wide temperature change is the norm, such as in window and door sealing application. The thermal stresses are usually encountered due to the difference in thermal expansion coefficient of different materials at the joint. The composition can be easily foamed by using a compressed gas such as nitrogen, carbon dioxide and compressed air. It is well suited for both sealant and foam-in-place gasket applications.

Sealant and foam-in-place gasket compositions based on rubber together at with least one semicrystalline olefinic polymer are not known in the prior art although adhesives containing ethylene propylene rubber (EPR), ethylene propylene diene rubber (EPDM) and/or olefinic polymers have been disclosed in several patents. The adhesives, however, are formulated to have different characteristics from sealants and generally lack the flexibility, resiliency, temperature fluctuation resistance and foamability. The majority of prior art adhesives are either solvent based or contain curing agents, and therefore, can not be considered as hot melt in a conventional sense. Due to the presence of solvent and/or curing agents, these adhesives cannot be processed with hot melt equipment. Tynan et al U.S. Pat. No. 5,798,175 disclosed adhesive compositions based a pressure sensitive adhesive (PSA) compositions based on a natural rubber or synthetic rubber and an amorphous olefin blend comprising EPR, hydrogenated polyisoprene and atactic polypropylene (APP). The adhesives were prepared by compounding the above-mentioned polymers, a tackifier and an organic solvent. These adhesives are thus solvent based, and are thus not considered to be a hot melt.

Davis et al U.S. Pat. No. 5,612,141 and European Patent Application EPO 714963A2 disclose an adhesive tape composition comprising a polymer blend containing at least one EPDM rubber and another polymer selected from the group consisting of polyisoprene, polybutadiene, EPR and mixtures thereof. The tape composition further includes at least one tackifier and a sulfur curing package. The composition has extremely high viscosity and contains curing agents, and therefore is not a conventional hot melt.

Davis et al European Patent Application 0672737A1 discloses an adhesive tape composition comprising at least one crosslinkable EPDM, one or more tackifier(s), a filler, a softener, a curing system for the rubber polymer. This composition is, again, not a conventional hot melt.

Planthottam et al U.S. Pat. No. 5,618,883 discloses a hot melt PSA composition based on tackified EPR rubber modified with a styrene-butadiene-styrene (SBS) block copolymer and/or styrene-ethylene-butylene-styrene (SEBS) block copolymer.

Tape compositions were also disclosed in U.S. Pat. Nos. 4,379,114, 4,404,056 and 5,242,727. These compositions usually contained an EPDM, or a blend of EPDM with other elastomers including butyl, halogenated butyl, polyisoprene, and styrene-butadiene rubber (SBR), a tackifier, a curing package and other optional ingredients such as plasticizer and filler and the like.

It is apparent that all the above prior art adhesive compositions are based on EPDM or EPR rubber, either alone or in combination with other types of rubbers. It is well known to those skilled in the art that all the rubbers herein noted above are amorphous polymers. The definition of amorphous polymers and their contrast to semicrystalline polymers can be found in most polymer chemistry textbooks, an example of which is *Polymers, Chemistry and Physics of Modern Materials* by J. M. J. Cowie, $2^{nd}$ Edition, Black Academic and Professionals.

These prior art compositions rely on curing or chemical crosslinking to acquire good cohesive strength and good adhesion characteristics. When uncrosslinked, adhesives based on EPR and EPDM have poor cohesive strength and poor bond strength. The presence of curing agents, and solvents in some cases, practically make them useless as a hot melt since the curing agents will cause gelling or crosslinking of the adhesive in the application equipment, thereby causing plugging and severe damage to the machinery. Furthermore, viscosities of the prior art adhesives are usually very high and beyond the capability of conventional hot melt coater equipment.

Wang et al U.S. Pat. No. 6,143,818 discloses a hot melt adhesive composition comprising a blend of EPR or EPDM with a semicrystalline olefinic polymer. This adhesive composition, however, does not have the flexibility, resiliency, temperature fluctuation tolerance and foamability to be used as a sealant or foam-in-place gasket material.

SUMMARY OF THE INVENTION

The present invention is directed to a hot melt sealant and foam-in-place gasket composition based on rubber and at least one semicrystalline olefinic polymer. The composition of the present invention has overcome the shortcomings of prior art butyl, SBC and polyurethane based hot melt sealants and foam-in-place gasket materials and provides excellent balance of properties of good adhesion to a broad range of substrates, high green strength, low tack, good flexibility, great tolerance to temperature fluctuation, resiliency, no toxicity and easy application. The composition also has excellent foamability and is especially suited as foam-in-place gasket material.

The hot melt composition of the present invention comprises a mixture of the following components:

1. a rubber or a blend of rubbers in the amount of about 5% to 50% by weight and preferably in the amount of about 5% to 30% by weight, and most preferably in the amount of about 10% to 25% by weight; typical examples of this rubber component include EPR, EPDM and/or styrenic block copolymers;
2. at least one semicrystalline olefinic polymer in the amount of about 5% to 40% by weight and preferably in the amount of about 5% to 30% by weight, and most preferably in the amount of about 5% to 25% by weight;
3. at least one amorphous poly-α-olefin (APAO) polymer in the amount of about 0% to 70% by weight, most preferably in the amount of about 5% to 30% by weight;
4. a compatible tackifier preferably in the amount of about 0% to 50% by weight;
5. a plasticizer in the amount of at least 30% by weight, preferably at least 32% by weight, and most preferably more than 35% by weight;
6. a wax in the amount of 0% to about 30% by weight;
7. a filler in the amount of 0% to about 60% by weight;
8. a stabilizer or antioxidant package in the amount of less than about 5% by weight, most preferably in the amount of 0.1% to 2% by weight.

the components of the composition adding up to 100% by weight. The hot melt composition may contain other ingredients that can modify the properties or change the appearance of the above basic hot melt composition. The composition will have a viscosity between 2,000 cP and 100,000 cP, preferably between 5,000 cP and 50,000 cP and most preferably between 5,000 cP and 30,000 cP, a R&B softening point between 200° F. and 350° F., preferably between 220° F. and 320° F. and most preferably between 240° F. and 310° F.

It is an objective of the present invention to teach the art of using the hot melt composition of the present invention in manufacturing applications as the sealant and/or foam-in-place gasketing material.

It is another objective of the invention to provide a process, or a means to apply the present hot melt sealant/foam-in-place gasketing composition to a target substrate by means of hot melt applying/dispensing equipment.

It is still another objective to provide articles that are sealed by the composition of the present invention.

DETAILED DESCRIPTION OF THE INVENTION

In accordance with the present invention, a hot melt sealant and foam-in-place gasket composition is provided, comprising a rubber, or a mixture of rubbers, in the amount of 5% to 50% by weight and preferably in the amount of 5% to 30% by weight, and most preferably in the amount of 10% to 25% by weight, together with at least one semicrystalline olefinic polymer in the amount of 5% to 40% by weight and preferably in the amount of 5% to 30% by weight, and most preferably in the amount of 5% to 25% by weight. The hot melt composition also includes at least one amorphous poly-α-olefin (APAO) polymer in the amount of 0% to 70% by weight, most preferably in the amount of 5 to 30% by weight, a compatible tackifier preferably in the amount of 0% to 50% by weight, a plasticizer in the amount of greater than 30% by weight, most preferably more than 35% by weight, a wax in the amount of 0% to 30% by weight, a filler in the amount of 0% to 60% by weight, and a stabilizer or antioxidant package in the amount of less than 5% by weight, most preferably in the amount of 0% to 2% by weight. Optionally, the composition can further contain other ingredients that can modify its properties or change its appearance. The optional ingredients include, but not limited to, colorants, deodorants, foaming agents and the like. The composition will have a viscosity between 2,000 and 100,000 cP, preferably between 5,000 and 50,000 cP and most preferably between 5,000 and 30,000 cP at an application temperature ranging from 200° F. to 400° F., a R&B softening point between 200° F. and 350° F., preferably between 220° F. and 320° F. and most preferably between 240° F. and 310° F.

The hot melt composition of the present invention includes a rubber or a blend of rubbers as a rubbery polymer component. The rubbery component is essential for the adhesion, flexibility, and low temperature resistance of the composition. Suitable rubber can be selected from, but not limited to, the group consisting of ethylene-propylene rubber (EPR), ethylene-propylene-diene material (EPDM), styrenic block copolymers (SBC), styrene-butadiene rubber (SBR), carboxylated SBR, styrene-butadiene-acrylonitrile, neoprene, polybutadiene, polyisoprene, polyester rubbers, polyurethane elastomers and the like. Although all the rubbery materials herein mentioned above can be used in the composition of current invention, EPR, EPDM and styrenic block copolymers are most preferred.

The term EPR, as used herein, refers to a class of elastomeric copolymers of ethylene and propylene, or such said copolymers modified with functional monomers. The functional monomers include a class of unsaturated organic compounds containing at least one functional group that include, but not limited to, carboxylic acid group, anhydride group, hydroxyl group, ester group, ether group, and primary, secondary or tertiary amine group, halogen and the like. The content of propylene in the copolymer is in the range of 15% to 70% by weight, preferably between 20% and 45% by weight. The term EPDM refers to a class of elastomeric terpolymers comprising of 15% to 70% by weight, preferably 20% to 45% by weight, of propylene, 20% to 80% by weight of ethylene and 2% to 15% by weight of a diene, the later includes, for example, 1,4-hexadiene, norbornadiene, ethylidene-norbornene, dicyclopentadiene, butadiene and isoprene. The EPDM used also includes the functionally modified products containing at least one functional group herein mentioned above. EPR and EPDM rubbers are commercially available from ExxonMobil Chemical Company under the trade name designation Vistalon and from DMS Polymers, Inc. under the trade name designation Kelton. Functionally modified EPDM containing anhydride group is sold under the trade designation Exxelor by ExxonMobil Chemical Company. The above basic EPR and EPDM may also contain one or more other α-olefin monomer unit(s). The definition of EPR and EPDM, therefore, extends to any elastomeric terpolymers of ethylene, propylene with a third α-olefin having C4 to C18 carbon length, and their derivatives modified with the functional monomers herein mentioned above.

The SBC block copolymers used in the composition of the present invention are a group of diblock, triblock, multiblock and radial or star block copolymers containing at least one styrene hard block and at least one soft, rubbery block, the said rubbery block consisting of butadiene, isoprene, ethylene-butene, ethylene-propylene, or butadiene-butene chain segments. These block copolymers are well known in the art and are subjects in a vast number of scientific publications. Examples of such block copolymers include, but are not limited to, styrene-butadiene di-, tri-, multi- and radial block copolymers, styrene-isoprene di-, tri-, multi- and radial block copolymers, styrene-ethylene-butene di-, tri-, multi- and radial block copolymers, styrene-ethylene-propylene di-, tri, multi and radial block copolymers, styrene-butadiene-butene di-, tri-, multi- and radial block copolymers, tapered block copolymers and the like. The said SBC block copolymer may also contain more than one type of rubbery block in the polymer chain.

The SBC block copolymers useful in the composition of the present invention are those having a styrene content from about 5% by weight to 50% by weight, preferably from about 10% by weight to 45% by weight, and most preferably from about 10% by weight to 30% by weight, a melt index (MI) from about 1 dg/min to about 200 dg/min, most preferably of about 4 dg/min to about 50 dg/min, as measurement by using ASTM-D-1238 (Cond. G) test method. Examples of SBC block copolymers of the type described hereinabove are Vector 4111, Vector 4211 and Vector 4411 styrene-isoprene-styrene triblock copolymers, commercially available from Dexco Polymers, Houston, Tex., Quintac BF-004-B styrene-isoprene radial block copolymer from Zeon Corporation, 4111 Bells Lane, Louisville, Ky., and Kraton G-styrene-ethylene-butene-styrene triblock copolymer from Kraton Polymers, Houston, Tex.

It should be pointed out that SBC, tri-, and multi-block copolymers from commercial sources often contain significant amounts of a diblock component. The diblock copolymer in this case is either a by-product due to incomplete coupling of manufacturing process or an intentional constituent designed to impart favorable physical properties to the block copolymer product in certain applications, such as for hot melt adhesives.

The hot melt composition of the present invention also includes an olefinic semicrystalline polymer component. Suitable semicrystalline olefinic polymers can be obtained by known methods, i.e. typically by either homopolymerization of one or by copolymerization of any combination of unsaturated olefins containing 2 to 18 carbon atoms, which include, but are not limited to, ethylene, propylene, butene-1, butene-2, pentene-1,4-methyl pentene-1, hexene-1, and octene-1. Suitable polymers can also be prepared by copolymerization of one or more above-mentioned olefins with other monomers such as dienes, vinyl acetate, vinyl chloride, vinylidiene chloride, acrylic acid, esters of acrylic acid, methacrylic acid, esters of methacrylic acid, vinyl ethers, allyl ethers, acrylamide and its derivatives, styrene, α-methyl styrene, vinyl alcohol and carbon monoxide. Examples of commercially available olefinic semicrystalline polymers include polyethylene, polypropylene, ethylene-propylene random and impact copolymers, ethylene-acrylic acid copolymers, ethylene-alkyl acrylate or methacrylate copolymers, ethylene-vinyl acetate copolymers, ethylene-vinyl alcohol copolymers and the like. It shall be recognized that mixtures of any of the above-mentioned olefinic polymers may be used as the basic components of the present invention. The inclusion of a semicrystalline olefinic polymer in the composition of the present invention is essential to obtain the desired level of cohesion, and thus, green strength.

Although any olefinic polymers of the types described above can be used in the composition of the present invention, homopolymers and copolymers of α-olefins consisting of 2 to 18 carbon atoms are preferred. Such types of polymers are well known in the art and are widely available from commercial sources. These polymers include conventional Ziegler-Natta ethylene polymers and copolymers. Ziegler-Natta polypropylene and copolymers, single-site-catalyst (SSC) such as metallocene-ethylene polymers and copolymers, SSC propylene polymers and copolymers and the like.

The term "semicrystalline polymer" used herein refers to those polymeric materials that contain both crystalline and amorphous regions in the solid state. In the crystalline region, the molecular chains of the polymer are all arranged in ordered three-dimensional arrays whose structure can be characterized by their unit cells, the smallest structural unit to describe a crystal. The amorphous region, in contrast, does not have ordered three dimensional structure in the solid state. The molecular chains are arranged randomly in space.

Semicrystalline polymers can be easily distinguished from completely amorphous polymers by observing the presence or absence of a melting point, Tm, and the associated enthalpy of melting (ΔHm) derived from the transformation of the crystalline state to liquid state upon heating. All semicrystalline polymers will exhibit a melting point, whereas the melting point is absent for amorphous materials. Amorphous polymers undergo a transition from a glassy solid to a rubbery state in a narrow temperature range around a glass transition temperature Tg. One should not confuse the Tg with Tm. Unlike melting transition of crystalline materials, the glass transition of amorphous polymers do not have an enthalpy change (ΔHm) associated with it.

It should also be pointed out that semicrystalline polymers defined herein above are often referred to, unscientifically, as crystalline polymers in the trade. Except for single crystals prepared in the laboratories on a small scale under well-defined experimental conditions, fully crystalline polymers have never been encountered in the commercial world. All so-called crystalline polymers, strictly speaking, are semicrystalline. The definition of semicrystalline polymer set forth herein, therefore, embraces the term "crystalline polymer" in the trade.

The melting point Tm, the enthalpy of melting ΔHm and the glass transition temperature Tg can be determined experimentally by using Differential Scanning Calorimetry (DSC). The technique is well known to those skilled in the art and is well described in scientific publications.

The semicrystalline olefinic polymers of the type described above can be purchased from numerous commercial sources, such as, for example, high and low density polyethylene from ExxonMobil under the trade name designation Escorene and Exact, polypropylene from Total Petrochemicals under the trade name designation Finacene and Finaplast, ethylene-vinyl acetate copolymer from Dupont under the trade name designation Elvax, ethylene-acrylic acid copolymer from Dow Chemical under the trade name designation Primacor, ethylene-ethyl acrylate copolymer from Akema under the trade name designation Lotryl, and ethylene-methyl acrylate-acrylic acid terpolymer from ExxonMobil under the trade name designation Escor.

The rubber component and the semicrystalline olefinic polymer employed in the composition of the present invention can be introduced into the composition individually as separate components. Alternatively, the rubber and the semicrystalline polymer can be pre-mixed to form a polymer blend or polymer alloy. Such blend or alloy can be prepared by mechanical mixing of a rubber or blend of rubbers with a semicrystalline polymer through an extruder or Banbury mixer or the like. It can also be made in situ by direct polymerization in a single or a serious of parallel reactors. An example of such in situ process is the Catalloy Process employed by Basell USA. Inc. This process utilizes two or more gas phase reactors in parallel that allow separate polymerization of different feedstock in each reactor. Each reactor runs independently of the other so each reactor product can be quite dissimilar to what is produced in the other. The product from each reactor can be mixed and pelletized to create a polymer blend. An example of polymer blends produced by Catalloy process is Adflex brand thermoplastic olefins (TPO), which are blends of EPR and semicrystalline propylene homo or copolymers.

The APAO polymers useful in the present invention consists of several different categories of atactic, low molecular weight, low melt viscosity, and essentially amorphous propylene based polymers. These polymers are well known to those skilled in the art and can be either homopolymers of propylene or copolymers of propylene with one or more α-olefin comonomer, such as, for example, ethylene, butene-1, hexene-1 and octene-1. The weight average molecular weight of the APAO polymers in the scope of the present invention is in the range of from about 1,000 to about 300,000 g/mol, preferably from about 10,000 to about 100,000 g/mol. The said polymers have advantageously a softening point between about 80° C. and 170° C. and a glass transition temperature from about −5° C. to −40° C. Although any APAO polymer falling in the range of physical properties herein described above can be used, the most preferred APAO is selected from the group consisting of propylene homopolymer, propylene-ethylene copolymer, propylene-butene-1 copolymer and propylene-ethylene-butene-1 terpolymer. The APAO polymers of the types herein described above are commercially available from Eastman Chemical Company, Kingsport, Tenn., under the trade name designation Eastoflex or from Huntsman Corporation, Houston, Tex., under the trade name designation Rexflex or from Degussa Corporation, Parsippany, N.J., under the trade name designation Vestoplast.

The tackifying resins or tackifiers which are used in the hot melt sealant/foam-in-place gasket material of the present invention are those which extend functional properties and improve specific adhesion. As used herein, the term "tackifying resin" include:

(a) aliphatic and cycloaliphatic petroleum hydrocarbon resins having Ring & Ball softening points of from 10° C. to 160° C., as determined by ASTM method E28-58T, the latter resins resulting from the polymerization of monomers consisting primarily of aliphatic and/or cycloaliphatic olefins and diolefins; also included are the hydrogenated aliphatic and cycloaliphatic petroleum hydrocarbon resins; examples of such commercially available resins based on a C5 olefin fraction of this type are Piccotac 9095 tackifying resin sold by Eastman Chemical. and Escoreze 1310LC sold by ExxonMobil Chemical Company;

(b) Aromatic petroleum hydrocarbon resins and the hydrogenated derivatives thereof;

(c) Aliphatic/aromatic petroleum derived hydrocarbon resins and the hydrogenated derivatives thereof;

(d) Aromatic modified cycloaliphatic resins and the hydrogenated derivatives thereof;

(e) Polyterpene resins having a softening point of from about 10° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(f) Copolymers and terpolymers of natural terpenes, e.g. styrene/terpene, α-methyl styrene/terpene and vinyl toluene/terpene;

(g) natural and modified rosin such as, for example, gun rosin, wood rosin, tall-oil rosin, distilled rosin, hydrogenated rosin, dimerized rosin and polymerized rosin;

(h) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(i) phenolic-modified terpene resins such as, for example, the resin product resulting from the condensation in an acidic medium of a terpene and a phenol;

Mixtures of two or more of the above described tackifying resins may be required for some formulations. Although a range of 5% to 50% by weight tackifying resin may be used, the preferred amount is from about 10% to about 30% by weight. Tackifying resins which are useful for the present invention can perhaps include polar tackifying resins, however, the choice of available polar tackifying resins is limited in view of the fact that many of the polar resins appear only partially compatible with EPR and semicrystalline olefinic polymers.

As noted above, tackifying resins which are useful within the scope of the present invention comprise about 0% to 50% by weight. Preferably, the tackifying resins can be selected from any of the nonpolar types, which are commercially available. Preferred resins are aliphatic petroleum hydrocarbon resins examples of which are based on C5 olefins such as Piccotac 9095 available from Eastman Chemical Company. Most preferred are nonpolar products which are hydrogenated DCPD based or aromatically modified derivatives thereof with softening points above 70° C. Examples of such resins are Escoreze 5400 and Escoreze 5600 sold by Exxon-Mobil Chemical Company.

A sufficient amount of plasticizer must be present in the composition of the present invention to provide flexibility, resiliency and temperature fluctuation tolerance. The preferred amount of plasticizer is in the range of at least about 30% by weight, preferably at least 32% by weight and most preferably above 35% by weight. Above about 70% by weight of plasticizer, however, the composition loses adequate cohesion strength and elevated temperature resistance. A suitable plasticizer may be selected from the group which includes the usual plasticizing oils, such as mineral oil, but also olefin oligomers and low molecular weight polymers, as well as vegetable and animal oils and derivatives of such oils. The petroleum derived oils which may be employed are, preferably, relatively high boiling materials containing only a minor proportion aromatic hydrocarbons. In this regard, the aromatic hydrocarbons should preferably be less than 30% and more particularly less than 15% of the oil, as measured by the fraction of aromatic carbon atoms. More preferably, the oil may be essentially non-aromatic. The oligmers may be polypropylenes, polybutenes, hydrogenated polyisoprenes, hydrogenated polybutadiens, or the like having average molecular weight between about 350 and about 10,000. Suitable vegetable and animal oils include glycerol esters of the usual fatty acids and polymerization products thereof. Other useful plasticizers can be found in the families of conventional dibenzoate, phosphate, phthalate esters, as well as esters of mono- or polyglycols. Examples of such plasticizers includes, but are not limited to dipropylene glycol dibenzoate, pentaerythritol tetrabenzoate, 2-ethylhexyl diphenyl phosphate, polyethylene glycol 400-di-2-ethylhexoate; butyl benzyl phthalate, dibutyl phthalate and dioctylphthalate. The plasticizers that find usefulness in the present invention can be any number of different plasticizers but the inventors have discovered that the mineral oil and liquid polybutenes having average molecular weight less than 5,000 are particularly advantageous. As will be appreciated, plasticizers have typically been used to lower the viscosity of the overall hot melt composition and to improve flexibility, resiliency and resistance to temperature fluctuation of the hot melt composition.

Waxes can be used to reduce the melt viscosity of the hot melt composition. Although amounts varying from about 0% to 30% by weight may be used in the composition of the present invention, the preferred amount is from 0% to 15% by weight. These waxes can also effect the set-up time and the softening point of the hot melt. Among the useful waxes are:

1. low molecular weight, that is, number average molecular weight (Mn) equal to 500-6000, polyethylene having a hardness value, as determined by ASTM method D-1321, of from about 0.1 to 120, having an ASTM softening point of from about 65° C. to 140° C.;
2. petroleum waxes such as paraffin wax having a melting point of from about 50° C. to 80° C. and microcrystalline wax having a melting point of from about 55° C. to 100° C., the latter melting points being determined by ASTM method D127-60;
3. synthetic waxes made by polymerizing carbon monoxide and hydrogen such as Fischer-Tropsch wax; and
4. polyolefin waxes. As used herein, the term "polyolefin wax" refers to those polymeric or long-chain entities comprised of olefinic monomer units. This type of materials are commercially available from Eastman Chemical Co. under the trade name designation "Epolene", from Clariant Corporation under trade name designation "Licocene" and from Baker Petrolite under the trade name designation "polywax". The materials which are preferred for use in the composition of the present invention have a Ring & Ball softening point of from about 80° C. to 170° C. As should be understand, each of these wax diluents is solid at room temperature.

Other substances which include hydrogenated animal, fish and vegetable fats and oils such as hydrogenated tallow, lard, soya oil, cottonseed oil, castor oil, menhadin oil, cod liver oil, and the like, and which are solid at the room temperature by virtue of their being hydrogenated, have also been found to be useful with respect to functioning as a wax diluent equivalent. These hydrogenated materials are often referred to in the adhesive industry as "animal or vegetable waxes".

The composition of the present invention may contain up to about 60% by weight of a filler. Typical fillers include, but not limited to, talc, calcium carbonate, clay silica, mica, wollastonite, feldspar, aluminum silicate, alumina, hydrated alumina, glass microspheres, ceramic microspheres, thermoplastic microspheres, baryte and wood flour.

The present invention may include a stabilizer in an amount of from about 0% to about 5% by weight. Preferably from about 0.1% to 2% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the hot melt as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl)benzene;
pentaerythirtol tetrakis-3(3,5-di-tert-butyl-4-hydroxyphenyl)propionate;
n-octadecyl-3(3,5-di-tert-butyl-4-hydroxyphenyl)propionate;
4,4'-methylenebis(4-methyl-6-tert butylphenol);
2,6-di-tert-butylphenol;
6-(4-hydroxyphnoxy)-2,4-bis(n-ocytlthio)-1,3,5-triazine;
2,3,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-3(3,5-di-tert-butyl-4-hydroxy-phenyl) propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediamenetetraacitic acid, slats thereof, and disalicylalpropylenediimine.

It should be understood that other optional additives may be incorporated into the hot melt composition of the present invention in order to modify particular physical properties. These may include, for example, such materials as inert colorants, deodorants, anti-microbial agents, fluorescent agents, surfactants, other types of polymers, etc.

The hot melt sealant composition of the present invention may be formulated by using any mixing techniques known in the art. Although the rubber component and semicrystalline olefinic polymer can be introduced as separate ingredients, the preferred raw material is the pre-mixed EPR (or EPDM)/semicrystalline polymer blends herein described above. A representative example of the prior art mixing procedure involves placing all the components, except the EPR rubber and semicrystalline polymer blend, in a jacketed mixing kettle equipped with a rotor, and thereafter raising the temperature of the mixture to a range from 160° C. to 200° C. to melt the contents. It should be understood that the precise temperature to be used in this step would depend on the melting points of the particular ingredients. The polymer blend component is subsequently introduced to the kettle under agitation and the mixing is allowed to continue until a consistent and uniform mixture is formed. The content of the kettle is protected with inert gas such as carbon dioxide or nitrogen during the entire mixing process.

The resulting hot melt adhesives may be then applied to substrates using a variety of application techniques. Examples includes hot melt glue gun, hot melt slot-die coating, hot melt wheel coating, hot melt roller coating, melt blown coating, spiral spray and the like. In a preferred embodiment, the hot melt composition is dispensed onto a substrate in the form of a bead by using a glue gun equipped with a bead nozzle. In another preferred embodiment, the hot melt bead is applied by using a coating head mounted to the arm of an industrial robot for precise control of the bead size and coating pattern. The coating head is equipped with a foaming chamber to allow gas to be introduced, admixed with the hot melt to form foam. The coating head can also be operated in gas-off mode to permit dispensing a solid hot melt bead. It is not the intent of this invention to provide a full description of robotic hot melt application techniques and the details can be found in the literature.

The present invention also relates to a process of coating or applying the hot melt composition by means of using the hot melt coating device herein disclosed above, which includes the following steps:

1. Melt the adhesive by means of a suitable melting container such as a Nordson™ Hot melt melter or the like at a temperature of about 250° F. to about 450C.°, preferably of about 300° F. to about 400° F. and most preferably of about 350° F. to about 400° F.;
2. Apply or coat the hot melt composition to a first substrate;
3. Bring a second substrate into contact with and press against the applied hot melt under compression or pressure to make a tight seal; depending on the actual circumstances of application, this step may be done at the manufacturing site immediately after the hot melt is applied, or it may be done at a remote location after a prolonged elapse of time by another party such as a customer, or it may not be needed at all.

In a preferred embodiment, the hot melt composition of the present invention is applied or dispensed in the form of solid bead by using a hot melt coating equipment fitted with a bead nozzle or tip, an example of the hot equipment of this type is Nordson Spectrum hot melt coater, which consist of a integrated melter, bump and control unit connected to a hand-held bead applicator, or coating head in the form of a glue gun. The hot melt sealant/foam-in-place gasket composition is applied in accordance with the procedures and conditions herein outlined above. The equipment of this type is best suited for operations where manual control is still common practice.

In another preferred embodiment, the hot melt equipment of the type described herein above is fully integrated with an industrial robot for automatic dispensing of the hot melt. In this case, the applicator, or coating head, is modified to have a heated mixing chamber that allows admix of compressed gas with the hot melt to form foam. The coating head is mounted to the arm of the robot and the whole set up is fully synchronized and automatically controlled to apply the precise amount of hot melt in a pre-determined pattern. The hot melt is dispensed as a foamed bead to further enhance the functional properties, such as flexibility and resiliency, of the hot melt. Any compressed gas can be used as the foaming agent in this process, examples of which include, but not limited to, carbon dioxide, nitrogen, argon and compressed air. As indicated herein above, the mixing chamber can be operated in off-mode by turning off the compressed gas supply, thereby dispensing hot melt in solid bead.

The hot melt composition of the present invention may be used in a number of applications such as, for example, in window and door manufacturing as glazing, gasketing and back-bedding material, in air filters, appliances, speakers and electrical sockets, as gasket/sealant, in auto weather strip as sealant and in auto door trim assembly as dam or banking material. It is obvious that the hot melt composition of the present invention can be adapted to numerous applications where sealing and/or gasketing operations are needed. The hot melt composition of the present invention has advantageously overcome the shortcomings of prior art hot melt by providing a well balanced properties of product safety, low residue tack, flexibility, resiliency, resistance to temperature fluctuation, easy application, long pot life, and more importantly, excellent adhesion to a broad range of substrates, especially to low surface energy hard to bond substrates such as untreated polyethylene and polypropylene. It is, therefore, another objective of the present invention to provide an article that utilizes the current hot melt composition as the sealant/gasket material.

Test and Materials

Brookfield viscosity was tested according to ASTM D-3236 Method at 350° F.

Ring & Ball softening point was determined with an automated Herzog unit according to ASTM E-28 method.

Sag resistance was measured in accordance with the following procedure. A polypropylene plaque of 12"×4" in dimension was used as the template for the test. The plaque was divided into three sections of 4" each along its length. Three solid beads of approximately 5 cm in length and 3 mm in diameter was then applied from a hot melt sample onto a section of the polypropylene test plaque in equal spacing by using a MiniSquirt hand-held hot melt glue gun, which was heated to about 350° F. The length of the bead was maintained parallel to the long edges of the plaque. The specimen was then placed in an air-circulating oven preheated to 230° F. with the hot melt beads parallel to its floor so that the beads were subjected to the pull of gravity. The slippage or sag of the beads was measured after 48 hours. If all three replicas of a hot melt bead slipped less than 2 mm, the hot melt was deemed to pass the test, otherwise, failed.

Low temperature impact resistance was measured at −40° F. by using the same test specimen as that described for sag resistance test. The test specimen was cooled to the test temperature by placing it in a freezer; the said freezer was set at the −40° F. After 24 hours equilibrating, the specimen was removed from the freezer and dropped immediately onto a concrete floor from about 6" height. If the hot melt beads remain adhered to the PP panel after the impact, it is deemed to pass. If the beads break away from the panel, it is deemed to fail.

Adhesion was measured according to the following procedure. The adhesive to be tested was first melted at 350° F. and then applied to a untreated plastic test panel (4"×1"×⅛" dimension) by using a spatula to cover about 1 square inch area. After conditioning at room temperature for 24 hours, attempt was made to remove the adhesive from the plaque by using a Hyde™ putty knife. If the adhesive was easily removed, it was rated 1. If it was not removable, it was rated 4. Intermediate ratings of 2 and 3 were assigned according to the degree of difficulty in removing the adhesive, with the higher number meaning stronger bond. The plastic plaques used for the test included polyethylene, polypropylene, and glass. All these panels were obtained from commercial sources and will be further described subsequently.

Polyethylene plastic test plaque was fabricated from Union Carbide DEFD1331 NAT grade high density polyethylene resin. It was obtained from Union Carbide Houston, Tex., now part of Dow Chemicals of Midland, Mich.

Polypropylene plastic test plaque was fabricated from Tenite V525 grade polypropylene resin obtained from Eastman Chemical Company, Kingsport, Tenn.

Insulated glass unit and plastic window lite frames were obtained from Therma Tru Technologies, Edgerton, Ohio.

Eastoflex P1010, obtained from Eastman Chemical Company, Kingsport, Tenn., is an atactic homopolypropylene type of APAO having a Brookfield viscosity of about 1,000 cP at 190° C., a Tg of about −10° C. and a softening point of about 150° C.

Adflex X100F is a polymer blend obtained from Basell Polyolefins in Wilmington, Del. It has a density of 0.90 g/cc and a MFR of about 8 g/10 min.

EOD 02-15 is a mRCP propylene-ethylene copolymer having a DSC melting point of 120° C., a melt flow rate (FMR) of 12 g/10 min at 190° C. per ASTM D-1238 test method.

Epolene N-15 is a low density and low molecular weight semicrystalline polypropylene with a R&B softening point of about 163° C. and a melt viscosity of about 600 cP at 190° C. It is available from Eastman Chemical Company, Kingsport, Tenn.

Kraton G-1657 is a styrene-ethylene-butene-styrene (SEBS) triblock copolymer containing about 13% by weight styrene and 29% by weight diblock copolymer. It is available from Kraton Polymers LLC, Houston, Tex.

MDV 91-9 is an ethylene-propylene rubber (EPR) having a Mooney viscosity of about 20 (ML 1+4@125° C.) per ASTM D 1646 (mod) test method.

Sylvarez ZT115LT is a styrenated terpene resin having a R&B softening point of 115° C. It is available from Arizona Chemicals, Panama City, Fla.

Escorez 5340, available from ExxonMobile Chemical Company, is a hydrogenated DCPD resin having a R&B softening point of about 140° C.

Nyplast 222B is a mineral oil plasticizer available from Nynas USA, Inc., Houston, Tex.

Piccotac 9095 is an aromatically modified C5 aliphatic hydrocarbon resin having a R&B softening point of 100° C. It is available from Eastman Corporation.

Camel Wite is a calcium carbonate filler available from Fitz Chemical Corporation, Chicago, Ill.

Vinyzene SB-1 PS is an anti-microbial agent available from Rohm Hass Company, Philadelphia, Pa.

Irganox 1010 is a hindered phenol type antioxidant. It is commercially available from Ciba Specialty Chemicals, Tarrytown, N.Y.

EXAMPLES

Examples 1-3

Hot melt examples of 1-3 shown in Table 1 were prepared with the ingredients and mixing procedures described herein above. A total of 250 grams each were made and the mixing was carried out at 350-375° F. under carbon dioxide atmosphere in a laboratory type of mixer what consists of a propeller powered by a motor, a heating mantle, a temperature control unit and a container of about 1 pint in size. The appropriate amounts of each component, calculated according to the ratios shown in the table, except the TPO Adflex polymer and the filler, were added to the container. The temperature of the container was then raised to melt the content. After the ingredients in the container were completely melted, the motor was turned on to start agitation. Subsequently, the Adflex polymer and the filler components were introduced in turn. The mixing was continued until the polymer was completely melted and the filler was uniformly dispersed. The adhesives of Examples 1-3 were tested according to the procedures herein described above and the results are listed in table 1.

TABLE 1

Examples 1-3

| Ingredients | Percent (%) by weight | | |
|---|---|---|---|
| | 1 | 2 | 3 |
| Nyplast 222B | 36.0 | 30.0 | 35.0 |
| Piccotac 9095 | 12.9 | 29.5 | 19.5 |
| Eastoflex P1010 | 22.0 | 20.0 | 25.0 |
| Vinyzene SB-1 PS | 0.6 | — | — |
| Camel Wite | 10.5 | — | — |

TABLE 1-continued

Examples 1-3

| Ingredients | Percent (%) by weight | | |
|---|---|---|---|
| | 1 | 2 | 3 |
| Adflex X100F | 17.5 | 20.0 | 20.0 |
| Irganox 1010 | 0.5 | 0.5 | 0.5 |
| Room Temperature Tack | None | None | None |
| Brookfield Vis. (cP), 350° F. | 12000 | 11500 | 11000 |
| R&B Softening Point (° F.) | 278 | 284 | 286 |
| Adhesion to | | | |
| PE | 4 | 4 | 4 |
| PP | 4 | 4 | 4 |
| Glass | 3.0 | 3.5 | 3.5 |
| Sag Resistance, 230° F. | Pass | Pass | Pass |

Example 4

This example demonstrates the process of applying the hot melt composition of the present invention automatically through a robotically controlled bead nozzle and the preparation of a sealed article therewith. A Nordson FoamMelt™ Model FM 151 hot melt coater was connected to the arm of an ASEA Model IRB 6 industrial robot, purchased from ABB Inc., Auburn Hill, Mich. A coating head was fitted with a bead nozzle to dispense hot melt in the form of a bead. The coating head also equipped with an air-mixing chamber to allow dispensing the hot melt composition in the form of foam, if needed. A 22"×64" plastic window frame obtained from Therma Tru Technology was used as the substrate. The frame consists of two halves, or lites; an exterior lite facing the outside and an interior lite facing the inside of a building. Two kilograms of the hot melt of Example 3 was prepared by using a lab mixer of about 1 gallon capacity according to the same procedure as in Examples 1-3. The sample was first applied as window back-bedding sealant in the form of foamed bead by introducing about 50% by volume of compressed air to the coating head. The bead was deposited into the inner groove the exterior lite to yield a hemisphere of about 2 mm above the groove. An isolated glass unit of appropriate size was subsequently laid down on top of the foamed bead and pressed tightly against the lite to form an impervious seal. Finally the interior lite was mated onto the insolated glass unit and fastened to the exterior lite by using screws to form the complete window assembly. The window unit produced can find use in residential, commercial and industrial buildings.

Example 5

This example shows an alternative process method of applying the hot melt composition onto an insulated glass unit. The same equipment, hot melt composition and process conditions as in Example 4 were used. Instead of applying into the groove of the exterior window lite, the foamed bead was coated onto the insulated glass unit along its perimeter to yield a hemisphere of about 5 mm in height. The exterior lite was next fitted to the back-bedding bead and pressed by hand to form a tight seal. The interior lite was then installed and fastened in the manner herein described above.

Example 6

A window frame with pre-applied gasketing seal was produced by applying the foamed hot melt bead of Example 4 to the outer peripheral groove of a window lite in the same manner as described in Example 4. The window frame, with so-produced foam-in-place gasket, can be installed to window slab to form a tight seal that protects the joint from infiltration of water, dirt and other extraneous substance into the building.

Examples 7-10

Hot melt examples of 7-10 were prepared similarly with the ingredients shown in Table 2 and the mixing procedure herein described in Examples 1-3. Instead of coming as a polymer blend, the rubber and the semicrystalline polymer herein were added separately as individual components. Examples 7 and 8 have an EPR, the same rubber components as in Examples 1-3, whereas Examples 9 and 10 contain a styrene-ethylene-butene-styrene triblock copolymer as the rubber components. In addition, the later examples also contain APAO as a third polymer. Each example was mixed at 365° F. under carbon dioxide atmosphere in the same type of mixer as described previously. Again the rubber and semicrystalline polymer were introduced at the last mixing step. The physical and performance properties of these examples were also tested according the test methods and procedures herein described above and the results are shown in Table 2.

TABLE 2

| Ingredients | Percent (%) by Weight | | | |
|---|---|---|---|---|
| | 7 | 8 | 9 | 10 |
| Nyplast 222B | 40.0 | 30.0 | 48.0 | 40.0 |
| Escorez 5340 | 10.0 | — | — | — |
| Sylvares ZT 115 LT | — | 14.5 | — | — |
| Camel wite | 20.0 | 35.0 | 18.4 | 12.4 |
| Epolene N-15 | 10.0 | — | — | — |
| EOD 02-15 | — | 8.0 | 14.0 | — |
| MVD 91-9 | 20.0 | 12.0 | — | — |
| Eastoflex P1010 | — | — | 5.1 | 17.1 |
| Kraton G-1657 | — | — | 14.0 | 20.0 |
| N-0 | — | — | — | 10.0 |
| Irganox 1010 | 0.5 | 0.5 | 0.5 | 0.5 |
| Room Temperature Tack | Low | Low | None | None |
| Brookfield Vis. (cP), 350° F. | 106,000 | 161,000 | 17750 | 12820 |
| R&B Softening Point (° F.) | 280 | 242 | 248 | 250 |
| Adhesion to | | | | |
| PE | 4.0 | 4.0 | 3.0 | 3.0 |
| PP | 4.0 | 4.0 | 3.5 | 3.0 |
| Glass | 4.0 | 4.0 | 2.5 | 2.5 |
| Sag Resistance, 230° F. | Pass | Pass | Pass | Pass |
| Impact Resistance at −40° F. | Pass | Pass | Pass | Pass |

Example 11

These examples demonstrate the process of applying the hot melt composition of the present invention via a manual hot melt hand gun as a solid bead for window or door back-bedding application and the preparation of a window article herewith. A 24"×38" plastic window frame consisting of an interior and an exterior lite, obtained from Therma Tru Technology, was used as the substrate. The hot melt composition of Example 7 was first melted at 350° F. in an air-circulating oven. Each molten material was then poured into the sample chamber of a pre-heated Minisquirt™ hand-held hot melt glue gun equipped with a bead nozzle. The temperature of the glue gun was set at 350° F. A hot melt bead was applied as window back-bedding sealant in the form of a solid bead. The bead was deposited into the inner groove the exterior lite. An isolated glass unit of appropriate size was subsequently laid down on top of the bead and pressed tightly against the lite to form an impervious seal. Finally the interior lite was mated onto the insolated glass unit and the exterior lite to form the complete window assembly. The window unit produced can find use in residential, commercial and industrial buildings.

Example 12

The steps of Example 11 were repeated by using the hot melt composition of Example 9 and the same plastic window frame substrate. An impervious window unit was produced that can be used in residential, commercial and industrial buildings.

Example 13, 14 and Comparative Example 1

The amount of plasticizer has a dramatic effect on low temperature flexibility and low temperature impact strength. To demonstrate the critical importance of having plasticizer in an amount equal to or greater than 30% by weight, Examples 12, 13 and Comparative Example C1 were prepared with the ingredients listed in Table 3 and the mixing procedure herein described above. The mixing was carried out at 365° F. These examples contain the same ingredients and they differ only in the weight percent of plasticizer and the corresponding adjustment of tackifier content to normalize the total percentage to 100% by weight.

TABLE 3

| Ingredients | Percent (%) by Weight | | |
|---|---|---|---|
| | 13 | 14 | C1 |
| Nyplast 222B | 31.0 | 30.0 | 28.0 |
| Sylvares ZT 115 LT | 17.3 | 18.3 | 20.3 |
| Camel wite | 11.2 | 11.2 | 11.2 |
| Eastoflex P1010 | 20.0 | 20.0 | 20.0 |
| Adflex X100F | 20.0 | 20.0 | 20.0 |
| Irganox 1010 | 0.5 | 0.5 | 0.5 |
| Room Temperature Tack | None | None | None |
| Brookfield Vis. (cP), 350° F. | 14770 | 15300 | 18340 |
| R&B Softening Point (° F.) | 286 | 290 | 292 |
| Impact Resistance at −40° F. | Pass | Pass | Fail |

Examples 12 and 13, which have 30% by weight plasticizer or above, passed the impact resistance test at −40° F., whereas Comparative Example C1 which has 28% plasticizer failed.

I claim:

1. A hot melt adhesive composition, comprising a blend of the following components:
   at least one rubber in an amount of about 5% to 50% by weight, said at least one rubber selected from the group consisting of ethylene-propylene rubber (EPR), ethylene-propylene-diene material (EPDM), and blends thereof;
   at least one semi-crystalline olefinic polymer in an amount of about 5% to 40% by weight;
   at least one amorphous poly-α-olefin polymer in an amount of about 0% to 70% by weight;
   a compatible tackifier in an amount of about 0% to 50% by weight;
   a plasticizing oil in an amount of more than 35% by weight and up to about 70% by weight, wherein said plasticizing oil is selected from the group consisting of mineral oil, and liquid polybutenes;
   a wax in an amount of about 0% to 30% by weight, said wax being solid at room temperature;
   a filler in an amount of about 0% to 60% by weight; and
   a stabilizer in an amount of about 0% to 5% by weight, the above components adding up to 100% by weight of the composition.

2. The composition of claim 1 wherein said at least one rubber comprises about 5% to 30% by weight of the composition.

3. The composition of claim 1 wherein said at least one rubber comprises about 10% to 25% by weight of the composition.

4. The composition of claim 1 wherein said at least one rubber is ethylene-propylene rubber (EPR).

5. The composition of claim 1 wherein said at least one semi-crystalline olefinic polymer is present in an amount of about 5% to 30% by weight.

6. The composition of claim 1 wherein said at least one semi-crystalline olefinic polymer is present in an amount of about 5% to 25% by weight.

7. The composition of claim 1 wherein said at least one semi-crystalline olefinic polymer is selected from the group consisting of polyethylene, polypropylene, ethylene-propylene random and impact copolymers, ethylene-acrylic acid copolymers, ethylene-alkyl acrylate or methacrylate copolymers, ethylene-vinyl acetate copolymers, ethylene-vinyl alcohol copolymers, and mixtures of the above olefinic polymers.

8. The composition of claim 1 wherein said at least one semi-crystalline-olefinic polymer is a homopolymer or copolymer of an α-olefin comprising 2-18 carbon atoms.

9. The composition of claim 1 wherein said at least one amorphous poly-α-olefin polymer is present in an amount of about 5% to 30% by weight.

10. The composition of claim 1 wherein said at least one amorphous poly-α-olefin polymer is selected from the group consisting of propylene homopolymer, propylene-ethylene copolymer, propylene-butene-1 copolymer and propylene-ethylene-butene-1 terpolymer, and blends of the above polymers.

11. The composition of claim 1 wherein said at least one amorphous poly-α-olefin polymer is a homopolymer of propylene or a copolymer of propylene with one or more α-olefin comonomers.

12. The composition of claim 1 wherein said at least one amorphous poly-α-olefin polymer has a weight average molecular weight of from about 1,000 to about 300,000 g/mol, a softening point between about 80° C. and 170° C., and a glass transition temperature of from about −5° C. to −40° C.

13. The composition of claim 1 wherein said tackifier is selected from the group consisting of aliphatic and cyclo-aliphatic petroleum hydrocarbon resins, hydrogenated aliphatic and cyclo-aliphatic petroleum hydrocarbon resins, aromatic petroleum hydrocarbon resins, hydrogenated aromatic petroleum hydrocarbon resins, aliphatic/aromatic petroleum derived hydrocarbon resins, hydrogenated aliphatic/aromatic derived hydrocarbon resins, aromatic modified cyclo-aliphatic resins, hydrogenated aromatic modified cyclo-aliphatic resins, polyterpene resins, copolymers and terpolymers of natural terpenes, natural and modified rosin, glycerol and pentaerythritol esters of natural and modified rosin, and phenolic modified terpene resins.

14. The composition of claim 1 wherein said components provide the composition with a viscosity between 2,000 cP and 100,000 cP, and a ring & ball softening point between 200° F. and 350° F.

* * * * *